United States Patent [19]
Buyze

[11] 3,709,333
[45] Jan. 9, 1973

[54] DISK BRAKE ACTUATOR AND ADJUSTMENT MEANS

[75] Inventor: Edwin K. Buyze, St. Clair Shores, Mich.

[73] Assignee: The Budd Company, Philadelphia, Pa.

[22] Filed: March 25, 1971

[21] Appl. No.: 127,916

[52] U.S. Cl. ........188/71.9, 188/196 BA, 192/111 A
[51] Int. Cl.............................................F16d 65/56
[58] Field of Search............188/72.7, 71.9, 196 BA; 192/111 A

[56] References Cited

UNITED STATES PATENTS

| 3,115,217 | 12/1963 | Butler | 188/72.7 X |
| 3,155,195 | 11/1964 | Brawerman | 188/71.9 |
| 3,404,755 | 10/1968 | Keatley et al. | 188/72.7 X |

FOREIGN PATENTS OR APPLICATIONS 1,016,564  1/1966  Great Britain........................188/71.9

Primary Examiner—George E. A. Halvosa
Attorney—Thomas I. Davenport, Edward M. Farrell, John D. Sowell, Alford L. Trueax, Jr. and William R. Nolte

[57] ABSTRACT

A disk brake system having an axially adjustable externally supported disk, a fixed caliper supporting brake pads for engaging the disk, a ball ramp actuating means for moving the brake pads into contact with the disk, and automatic adjustment means for compensating for pad wear and manual adjustment means for initial pad spacing and spacing adjustment after pad replacement.

4 Claims, 3 Drawing Figures

PATENTED JAN 9 1973

3,709,333

INVENTOR.
EDWIN K. BUYZE
BY
*A. L. Truax, Jr.*
ATTORNEY

DISK BRAKE ACTUATOR AND ADJUSTMENT MEANS

This invention relates to a disk brake assembly having an externally supported disk and more particularly to the actuating means for moving the brake pads against the disk and spring means for adjusting the pads relative to the disk to compensate for pad wear.

It has been found that mechanically actuated brakes on vehicle trailers are easier to connect and maintain than hydraulically actuated brakes. Various mechanical actuating devices are employed to move the brake pads into contact with the friction surface to effect a braking action.

It is an object of this invention to provide a mechanically actuated brake system having a ball-ramp actuation assembly with a spring adjuster for maintaining the brake pads clearance with an externally supported disk.

Due to the heavy loading of vehicle trailers, the brake pads wear is greatly increased and ease of adjustment is an important consideration when selecting a brake assembly.

Another object of this invention is to provide a mechanically actuated disk brake assembly having an automatic adjustment means that is actuated for possible adjustment whenever the brake is applied.

These and other objects of this invention will become apparent as reference is made to the following specification and drawings wherein.

Figure 1:
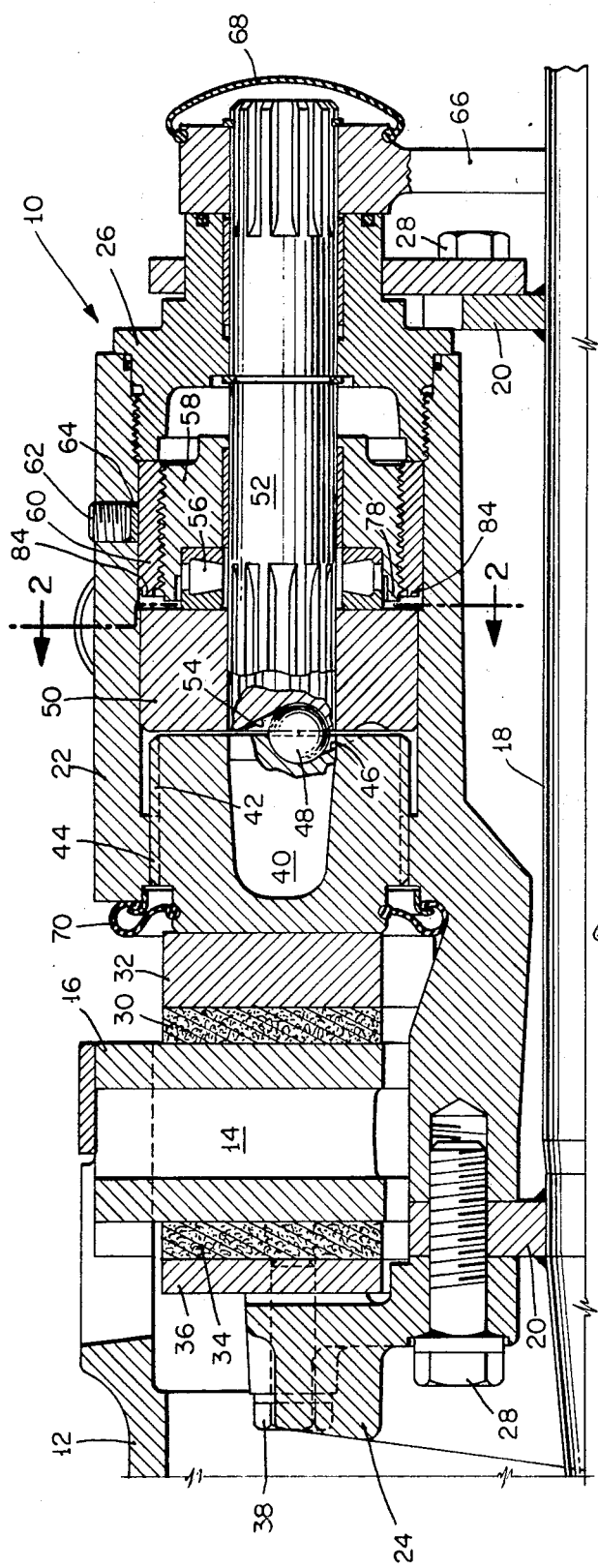
FIG. 1 is an axial cross-sectional view of the disk brake of this invention.

Referring now to the drawings, as best seen in FIG. 1, a disk brake assembly 10 including a driver 12 secured to and rotatable with the vehicle wheel (not shown) and floatingly supporting a brake disk 14 by a plurality of lugs 16 extending from the external surface of the disk.

The brake assembly is supported on the vehicle axle housing 18 by a plurality of support arms 20 secured to the axle housing by welding or other suitable means. The brake assembly housing 22, end plate 24, and housing extension 26 are secured to the support arms 20 by bolts 28.

Supported in the housing 22 adjacent the disk 14 is the inner brake pad 30 secured to the inner backing plate 32. Supported on the end plate 24 adjacent to the outer surface of the disk 14 is the outer brake pad 34 secured to the backing plate 36. The backing plate 36 is secured to the end plate 24 by a pair of bolts 38.

The actuator assembly includes a front cam member 40 axially slidably supported in the housing 22 by splines 42 about its periphery which cooperate with the internal splines 44 of the housing 22. One end of cam member 40 contacts the backing plate 32 and the other end contains a plurality of ramps 46 formed thereon for supporting balls 48. The rear cam member 50 is rotationally and axially slidably supported in the housing 22. The rear cam member 50 is splined on one end of shaft 52 for rotation therewith and axial movement therealong. The end of the rear cam adjacent the front cam 40 contains a plurality of ramps 54 formed thereon for cooperating with the ramps 46 of front cam 40 in containing and supporting the balls 48. The adjuster mechanism includes a thrust bearing 56 that engages the other end of the rear cam 50 and is supported in an adjuster nut 58 threadably supported in the adjuster thrust collar 60 which is rotatably supported in the housing 22 and restricted from movement away from the cam members by contact with the housing extension 26 threadably secured to the one end of the housing 22. A lock screw 62 and lock screw pad 64 are positioned in the housing 22 to secure the adjuster thrust collar 60 from undesired rotation. Rotation of the adjuster nut 58 will move the actuator and movable pad axially relative to the fixed pad and disk for adjusting the clearance therebetween.

An actuation lever 66 is splined to the rear end of shaft 52 so that the shaft 52 will rotate as the actuation lever is moved. A dust boot 68 is secured to the lever 66 and extends about the end of shaft 52 to protect the connection from dust. A second dust seal 70 extends between the housing 22 and the front cam member 40 to protect the actuation members in the housing from dust and dirt.

Figure 3:
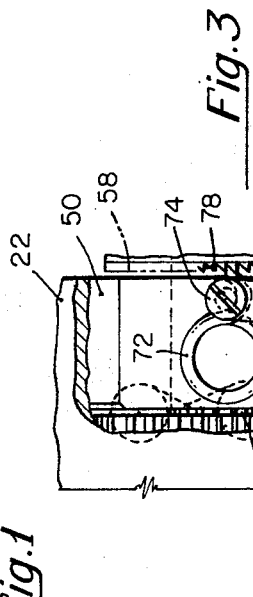
FIG. 3 is a view in the direction of the arrows, substantially along the line 3—3 of FIG. 2, showing the mounting of the adjustment spring and the cooperating teeth on the thrust collar for engaging the one end of the spring.
Figure 2:
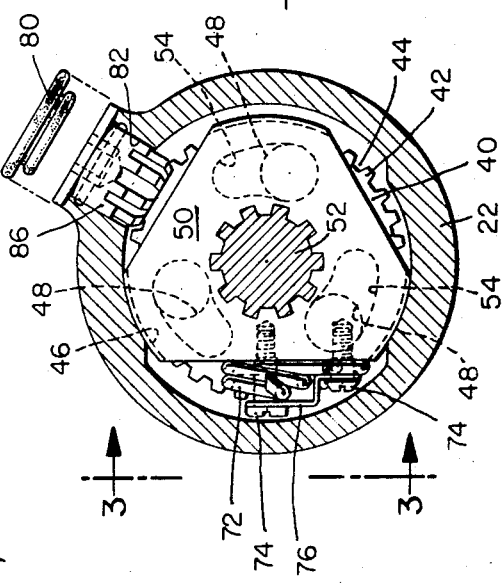
FIG. 2 is a view in the direction of the arrows, substantially along line 2—2 of FIG. 1, illustrating the ball-ramp actuating means, automatic adjustment spring and manual adjusting driver.

Referring now to FIGS. 2 and 3, an adjusting spring 72 is secured to the rear cam member 50 by bolts 74 and holding bracket 76. The free end of the spring 72 engages teeth 78 formed on the edge of the adjuster nut 58 adjacent the rear of cam member 50 for automatically adjusting the pad-disk clearance during each application of the brake system.

A flexible plug 80 is normally positioned in an aperture 82 formed in the housing 22 for access to the gear teeth 84 formed on the edge of adjuster thrust collar 60. An adjuster tool 86 is shown in position in the aperture 82 in FIG. 2 to cooperate with the gear teeth 84 for adjusting the clearance of the brake pads 30, 34 relative to the brake disk 14. The adjustment is accomplished by releasing the lock screw 62, removing the plug 80 from aperture 82 and placing the adjuster tool 86 into the aperture 82 and into meshing engagement with the gear teeth 84. By rotating the adjuster tool 86, the adjuster thrust collar is rotated and the adjuster nut 58, restricted from rotation by the pressure of the adjusting spring 72 is moved axially along the shaft 52 by the threaded connection with the thrust collar. Axial movement of the adjuster nut 58 acting through the thrust bearing 56, rear cam 50 and front cam 40 which contacts the backing plate 32 of brake pad 30, causes the brake pad 30 to be moved relative to the brake disk 14 for adjustment of the clearance therebetween. After the adjustment has been made, the adjuster tool 86 is removed and replaced with plug 80 and the lock screw tightened to secure the adjuster thrust collar from movement.

To actuate the braking system, the actuation lever 66 is rotated counter-clockwise when viewed in the direction of the arrows 2—2 from its rest or starting position. Such rotation of lever 66 rotates rear cam member 50 therewith causing the balls 48 to move up the ramps 54, 46, the front cam member 40 moves axially away from the rear cam member 50 in the splines 42, 44 causing the brake pad 30 secured to backing plate 32 to move into contact with the disk 14. Further axial movement causes the disk 14 to move into contact with the outer brake pad 34 and to be pressed between the pads 34, 30 thereby frictionally engaging the disk and effecting a braking action thereon in the braking position. When pressure on lever 66 is released, a return spring (not shown) connected to the lever 66 and biasing the lever clockwise will urge the rear cam to its starting position.

Once the initial adjustment of the brake pad to disk clearance has been made by the tool 86, the adjusting spring 72 will maintain the proper clearance. As the rear cam 50 is rotated, the free end of spring 72 rides on the slope of the teeth 78 of the adjuster nut 58 and if too much rotation movement of cam 50 is required to being the pads 30, 34 into contact with the disk 14, the free end of the spring 72 will drop into contact with the next tooth of the adjuster nut 58 and when the lever 66 returns to its starting position the biasing action of spring 72 rotates the adjuster nut 58 until the free end of spring 72 contacts bolt 74 which stops further rotation. Thus it can be seen, the clearance between the pads and the disk may be controlled by varying the distance between the teeth 78 on the adjuster nut 58 or providing more than one spring 72 to alternately engage the teeth 78 for adjustment of the clearance. Thus, a predetermined clearance may be maintained between the pads and the disk.

While one embodiment of this invention has been illustrated and explained, it is to be understood that they may be various embodiments and modifications within the scope of the following claims.

What is claimed is:

1. An automatic brake pad clearance adjuster for a disk brake system being movable between a rest position and a braking position and having an externally supported axially adjustable brake disk, a fixed caliper positioned inwardly of the disk and supporting a fixed brake pad on one side of said disk and an axially movable brake pad on the other side of said disk and a ball-ramp actuating means for moving said pads into engagement with said disk, said actuating means having said automatic adjuster connected thereto, said adjuster including a first member rotatably supported in said caliper and restricted from axial movement away from said disk, a second member contacting said ball-ramp actuating means for restricting axial movement of said actuating means from said disk, a threaded connection between said first and second members, locking means for securing said first member from rotation in said caliper, said second member having a plurality of teeth adjacent said actuator, a spring mounted on said actuator having an arm extending into resilient engagement with said teeth of said second member for rotating said second member when rotation of said ball-ramp actuating means exceeds a predetermined rotational movement during engagement of said pads with said disk by movement of said brake system from rest position to braking position, whereby such rotational movement will move said second member axially toward said disk by means of the threaded connection with the first member.

2. In combination in a disk brake system having an externally supported axially adjustable brake disk and a fixed caliper positioned inwardly of said disk, said caliper having a housing, a pair of brake pads positioned in said housing on opposite sides of said disk for contacting said disk, one of said pads secured in said housing and the other of said pads movably mounted in said housing for movement into frictional engagement with said disk, and a ball-ramp actuating means for moving said movable pads into frictional contact with said disk and moving said disk into frictional engagement with said fixed pad, said ball-ramp actuating means including a first cam member keyed into said housing for axial movement toward and away from said disk without rotational movement thereof relative to said housing, a second cam member rotationally supported in said housing adjacent said first cam member, and having at least one surface generally parallel to its axis of rotation, a thrust bearing contacting said second cam member and restricting axial movement thereof away from said disk, a plurality of balls supported in ramps on the adjacent surfaces of said cam members for maintaining said cam members in a spaced relationship, means for rotating said second cam member whereby rotation of said second cam in one direction rolls the balls up the ramps causing the cam members to be moved axially apart and move the pads into contact with the disk and rotation in the other direction moves the balls down the ramps permitting the cams to approach each other and permitting the pads to move out of contact with the disk, and an automatic pad clearance adjuster including a spring means secured on the paralled surface of said second cam member and having an arm extending therefrom, an extensible support supporting said thrust bearing and operably engaging said spring arm, said extensible support being extended by a predetermined amount of movement of said spring arm for moving said thrust bearing toward said disk for adjusting the clearance between said pads and said disk thereby; said extensible support includes a first member secured in said housing , locking means for securing said first member from rotation in said housing, a second member supporting said thrust bearing, and a threadable connection interconnecting said first and second members, whereby rotation of said second member in one direction will extend said second member and said thrust bearing toward said pads by the meshing of said threadable connection, a plurality of teeth on said second member adjacent said thrust bearing positioned for cooperating with said spring arm for extending said extensible member by rotation thereof during rotation of said second cam member.

3. The disk brake system as claimed in claim 2 further including a manual clearance adjuster for initially adjusting the clearance between said pads and said disk in the rest position, said manual clearance adjuster includes a plurality of gear teeth formed on the edge of said first member, an adjuster tool positionable into meshing contact with said gear teeth for rotating said first member as said tool is rotated, manual means for releasing and locking said locking means for releasing said first member for rotation as desired, whereby rotation of said first member by said tool moves said second member axially by means of the threaded connection and thereby adjusts the clearance between the pads and the disk.

4. The clearance adjuster as claimed in claim 3 wherein said spring means includes an arm biased against a stop on said actuating means and biased into contact with said teeth of said second member, said spring arm rotates with said actuation means and rides over said teeth during movement of said brake system to the braking position for engaging a new tooth at said second member and rotating said second member by the biasing action of said spring means as said actuating means rotates back to its starting position when the brake system is deactivated.

* * * * *